F. P. COUSE.
Whips.

No. 143,065. Patented September 23, 1873.

Witnesses
S. U. Piper
L. N. Höller

Frederic P. Couse.
by his attorney
R. H. Eddy

UNITED STATES PATENT OFFICE.

FREDERIC P. COUSE, OF WESTFIELD, MASSACHUSETTS.

IMPROVEMENT IN WHIPS.

Specification forming part of Letters Patent No. 143,065, dated September 23, 1873; application filed June 25, 1873.

*To all whom it may concern:*

Be it known that I, FREDERIC P. COUSE, of Westfield, of the county of Hampden and State of Massachusetts, have invented a new and useful Improvement in Whips; and do hereby declare the same to be fully described in the following specification and represented in the accompanying drawings, of which—

Figure 1:
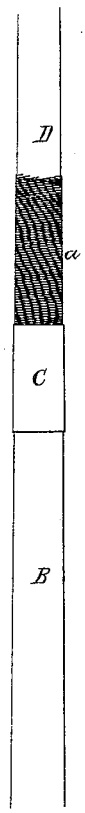
Figure 2:
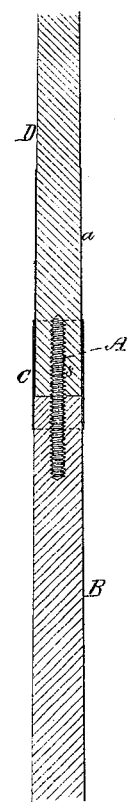

Figure 1 is a side view, and Fig. 2 a longitudinal section, of portions of a whip handle and stock, connected in accordance with my improvement.

In carrying out my invention, I make use of a short metallic cylinder or piece of wire, A, having a male screw, $s$, cut upon it throughout its length. This wire, so provided with a screw, I insert or screw for about half its length into the smaller end of the handle B, and in line with the axis of the latter. Next I drive upon the handle of such smaller end, and so as to encompass it and the projecting portion of the screw concentrically, a metallic tube or ferrule, C. Next the whip-stock D, having its braided covering $a$ arranged upon it in the ordinary way, I insert endwise into the tube or ferrule, and screw upon the screw A down to or nearly to the next adjacent end of the handle.

Previous to the introduction of the whip-stock into the ferrule, a small amount of glue or cement may be placed within the latter in order that while the stock may be in the act of being screwed into place, such cement may be forced between the contiguous ends of the handle and stock, and about the latter and the inner surface of the ferrule in a manner to aid in fixing the parts together. The whole forms a strong and durable connection of the stock and handle, protects the end portion of the braiding from unweaving, and, besides, making a good finish. The ferrule prevents the ends of the handle and the stock from being split by the screw.

I make no claim to a cane-handle made as shown in the United States Patent No. 57,367. Although I use a screw-rod to connect the parts of a whip-stock, I employ with such a ferrule, whereby the handle B and the stock D and braided cover $a$ are not only drawn together and into the ferrule, but the latter is made to protect the braid from raveling or unweaving, as stated.

I claim—

In a whip the screw A, the ferrule C, the handle B, the braiding $a$, and the stock D, arranged and combined as set forth.

FREDERIC P. COUSE.

Witnesses:
R. H. EDDY,
J. R. SNOW.